A. G. AND A. RONNING.
UNIVERSAL HITCH DEVICE.
APPLICATION FILED JUNE 30, 1919.

1,406,418. Patented Feb. 14, 1922.

Inventors:
Andrean G. Ronning
Adolph Ronning
By Whiteley and Ruckman
Their Attorneys.

UNITED STATES PATENT OFFICE.

ANDREAN G. RONNING AND ADOLPH RONNING, OF MINNEAPOLIS, MINNESOTA.

UNIVERSAL HITCH DEVICE.

1,406,418. Specification of Letters Patent. Patented Feb. 14, 1922.

Original application filed March 6, 1916, Serial No. 82,516. Divided and this application filed June 30, 1919. Serial No. 307,737.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Universal Hitch Devices, of which the following is a specification.

Our invention relates to universal hitch devices and an object is to provide a device of this character by means of which various implements may be attached to a tractor for operation thereby. This application is a division of our prior application, Serial Number 82,516, filed March 6, 1916, which subsequent to the filing of the present application matured into Patent Number 1,340,461, dated May 18, 1920.

The full objects and advantages of our invention will appear in connection with the detailed description thereof and the novel features embodied in our inventive idea will be particularly pointed out in the claims.

Figure 1:
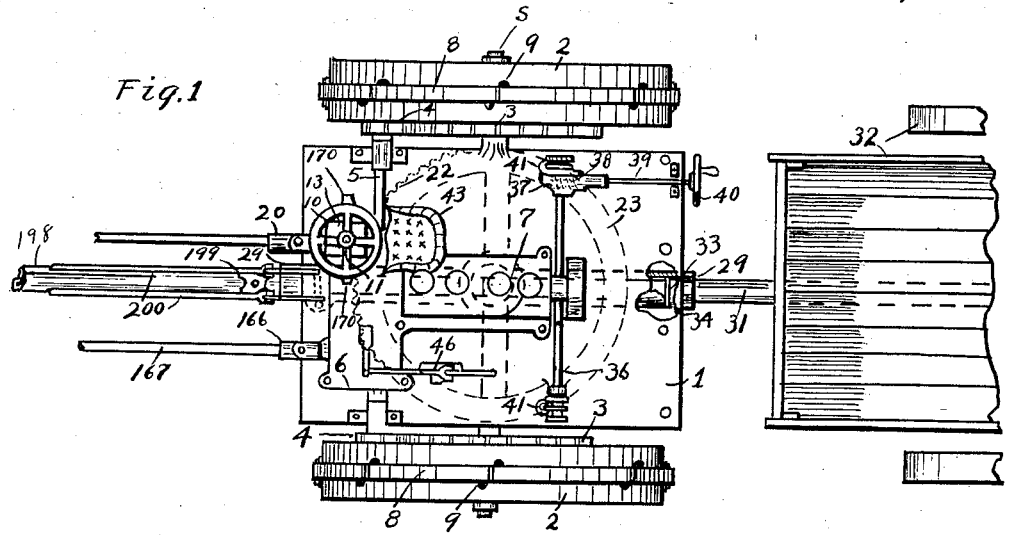
Figure 2:
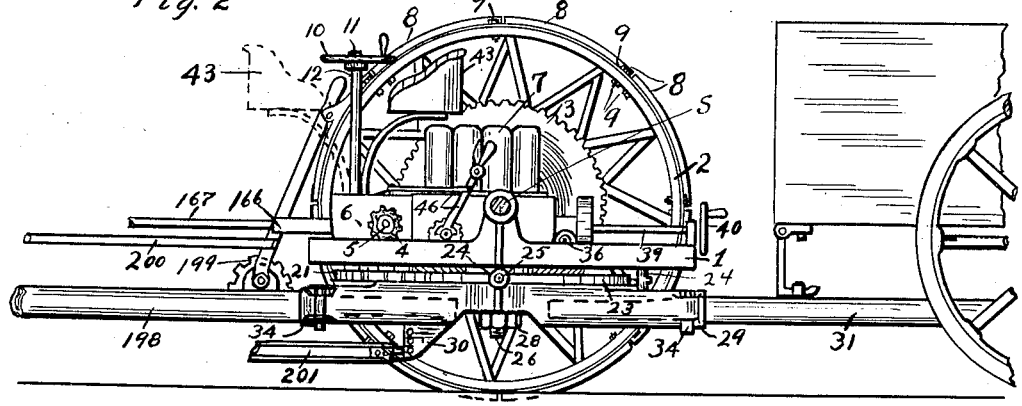
Figure 3:
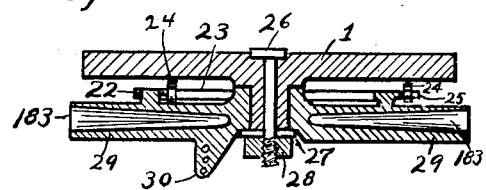

In the accompanying drawings, Fig. 1 is a top plan view of a tractor showing part of the universal hitch and steering device in dotted lines and a truck attached at the rear thereof and the tongue of another vehicle attached at the front thereof. Fig. 2 is a view in side elevation of the construction shown in Fig. 1 with one of the drive wheels of the tractor removed. Fig. 3 is a detail view in vertical section showing a portion of the universal hitch and steering device.

Referring to the particular construction shown in the drawings, the main frame 1 of a tractor is carried by and substantially balanced on a shaft $s$ and drive wheels 2 which carry at their inner sides spur gears 3 meshing with spur gears 4 which are carried on the outer and free ends of the differential shafts 5 which are suitably journaled on the main frame 1, and in the differential housing 6, and are connected to the engine 7 by customary differential and clutch mechanism ordinarily employed for such purposes. The drive wheels 2 are shown provided with tire sections 8 fastened by bolts 9. A steering wheel 10 is attached to a shaft 11 which runs through a steering post 12 attached to a casting 13 secured to the front portion of the frame 1. The shaft 11 may be connected in suitable manner to a universal knuckle 20 adapted to be connected to the steering mechanism of various devices which may be attached to the tractor. The shaft 11 carries at its lower end a spur gear 21 which meshes with the spur teeth 22 of a universal hitch wheel 23 which is pivotally or rotatably attached to the tractor frame at a point in vertical alinement with the shaft $s$. Rollers 24 are journaled on pins 25 which are attached at the circumference of the universal hitch wheel 23 in such manner as to allow the rollers 24 to ride on a circular track which is provided for this purpose on the under side of the frame 1 so as to facilitate the turning of the wheel 23 when it is connected to the frame 1 by a bolt 26, a washer 27 and a nut 28, as shown in Fig. 3. The wheel 23 is provided with hitch members 29 which are hollow so as to permit the insertion of a tongue 31 of a wagon or truck 32. The tongue 31 is provided with a groove 33 cut around it so that it may be securely fastened to the tractor when the keys 34 are inserted in openings in the outer ends of the hitch members 29 in such manner as to allow the tongue to freely turn when secured by the keys. This arrangement will allow the vehicle which is attached to the tractor to pass freely over rough places and obstructions without twisting the main frame, and the tractor may be guided and directed by turning the universal hitch wheel 23 by means of the steering wheel 10. The above-described coupling operation may be performed with equal ease from either end of the tractor, and the implement already attached at one end may remain attached while the tractor is hitched at the other end or is in proper position to be hitched to the implement which it is desired to attach so as to avoid tipping the tractor when transferring the hitching connection from one implement to another. A shaft 36 journaled in the tractor frame carries at one end a worm gear 37 which meshes with a worm 38 which is secured to the front end of a shaft 39 journaled in the frame 1, and which carries at its rear end a hand wheel 40. Chains or cables 41 are attached to the end portions of the shaft 36. By fastening the free ends of the cables or chains to the desired attachment the latter may be readily raised to the tractor frame into proper position to be secured thereto by turning the hand wheel 40. The attachment may be lowered from the tractor frame to the ground by turning the hand wheel in the opposite direction. The seat 43 may be attached to the tractor frame in well-known manner on either side of the steering post 12, and the position of the seat when the tractor is used for plowing and similar work in which the tractor is run in the opposite direction is indicated by dotted lines in Fig. 2. The tractor may be provided with the usual friction clutch belt pulley mechanism adapted to be put into and out of action by the lever mechanism 46.

If ordinary farm implements are to be pulled by the tractor they may be provided with reach members 198 which are inserted in the sockets 183 of the universal hitch member 29 and, being provided with grooves 33 such as shown in connection with the reach 31, they may be secured to the hitch member by inserting the keys 34. If such implement be of a nature to require adjustment from time to time its reach member 198 may be provided with a sufficient number of lever mechanisms 199 properly adapted for regulating by the right length of rods 200 so that the attached implement may be easily operated from the driver's seat, which in such event is attached to the tractor frame in the position shown in dotted lines in Fig. 2. If such implement be a plow the rear end of the reach member 198 is suitably attached to the frame thereof, while the front end of the plow beam 201 is suitably attached to the hitch member 30 of the universal hitch casting 29 in order to prevent the tractor from applying too much weight to the wheels of the plow while pulling it forward.

We claim:

1. A device of the character described comprising a tractor frame, a universal hitch wheel rotatably mounted on said frame, a hitch member provided with a socket rigidly attached to said wheel, and means for detachably and rotatably securing the end of a tongue member in said socket.

2. A device of the character described comprising a tractor frame, a universal hitch wheel rotatably mounted on said frame, hitch members provided with sockets rigidly attached to said wheel at diametrically opposite points thereof, and means for detachably and rotatably securing the ends of tongue members in said sockets.

In testimony whereof we hereunto affix our signatures.

ANDREAN G. RONNING.
ADOLPH RONNING.